(12) United States Patent
Ando et al.

(10) Patent No.: US 7,142,289 B2
(45) Date of Patent: Nov. 28, 2006

(54) RADAR APPARATUS

(75) Inventors: Takamasa Ando, Gifu (JP); Takekazu Terui, Kariya (JP); Makoto Inomata, Handa (JP)

(73) Assignee: Denso Corporation, Kariya (JP)

( * ) Notice: Subject to any disclaimer, the term of this patent is extended or adjusted under 35 U.S.C. 154(b) by 234 days.

(21) Appl. No.: 10/878,352

(22) Filed: Jun. 29, 2004

(65) Prior Publication Data

US 2005/0046823 A1    Mar. 3, 2005

(30) Foreign Application Priority Data

Sep. 3, 2003   (JP)   ............................ 2003-311776

(51) Int. Cl.
*G01C 3/08*   (2006.01)
(52) U.S. Cl. .................... 356/4.01; 356/3.01; 356/5.01
(58) Field of Classification Search ................ 356/4.01
See application file for complete search history.

(56) References Cited

U.S. PATENT DOCUMENTS

| | | | |
|---|---|---|---|
| 5,745,050 A | 4/1998 | Nakagawa | |
| 5,805,527 A | 9/1998 | Hoashi et al. | |
| 6,147,637 A * | 11/2000 | Morikawa et al. | ............ 342/70 |
| 2004/0257556 A1* | 12/2004 | Samukawa et al. | ........ 356/4.01 |

FOREIGN PATENT DOCUMENTS

| | | |
|---|---|---|
| JP | A-7-198851 | 8/1995 |
| JP | A-7-318650 | 12/1995 |

\* cited by examiner

*Primary Examiner*—Thomas H. Tarcza
*Assistant Examiner*—Luke Ratcliffe
(74) *Attorney, Agent, or Firm*—Posz Law Group, PLC (57) ABSTRACT

In a radar apparatus, a laser light generating device generates a laser light. An optical device reflects the laser light to output it in a predetermined direction. The optical device has at least two reflective surfaces with different reflectance to the laser light. A reflected light detecting device detects a reflected light when the laser light is reflected by an object. An object detecting device detects the object based on the reflected light. An intensity changing device changes an intensity of the outputted laser light by switching the reflective surfaces. Thus, it can be prevented that an intensity of the reflected light becomes too large and an accuracy of detection of the object can be improved.

9 Claims, 7 Drawing Sheets

RADAR APPARATUS

CROSS REFERENCE TO RELATED APPLICATION

This application is based on Japanese Patent Application No. 2003-311776 filed on Sep. 3, 2003, the disclosure of which is incorporated herein by reference.

FIELD OF THE INVENTION

The present invention relates to a radar apparatus which emits a laser light and receives a reflected light to detect an object.

BACKGROUND OF THE INVENTION

A radar apparatus is disclosed in U.S. Pat. No. 5,805,527 (corresponding to JP-A-H9-236661). This radar apparatus emits a laser light and receives a reflected light from an object. This radar apparatus measures a distance to the object based on a time period between an emission time when the laser light is emitted and a reception time when the reflected light is received. Therefore, it is necessary that the radar apparatus detects the reception time accurately.

In order to detect the reception time, the radar apparatus converts the reflected light to a received signal whose magnitude corresponds to an intensity of the reflected light. For example, it is possible that a timing when a rising of the received signal reaches a predetermined threshold value for avoiding an influence of noise is regarded as the reception time. However, the slope of the rising and falling of the received signal depends on the intensity of the reflected light, which changes depending on an intensity of the emitted laser light, a reflectance of the object and the like. Accordingly, the reception time changes according to the intensity of the reflected light even when the distance to the object is the same.

Therefore, the above radar apparatus performs the following processing in order to detect the reception time tp.

(1) A time t1 when the rising of the received signal reaches a predetermined threshold value for avoiding an influence of noise is detected.

(2) A time t2 when the falling of the received signal reaches the predetermined threshold value is detected.

(3) A mean time tc ($=(t1+t2)/2$) of t1 and t2 is calculated.

(4) A time period $\Delta t$ ($=t2-t1$) between t1 and t2 is calculated.

(5) A correction amount $\Delta \alpha$ for correcting tc is determined according to the relationship between $\Delta t$ and the correction amount $\Delta \alpha$. The relationship is determined based on an experimental result or the like in advance.

(6) The reception time tp is calculated by subtracting $A\Delta\alpha$ from tc.

According to the above processing, the reception time tp can be substantially set to a timing when the received signal reaches its peak. Therefore, the reception time tp is not influenced by a difference of the intensity of the reflected light.

However, the received signal may saturate when the laser light with high intensity is emitted to detect the object at a long distance and the object at a short distance or the object with high reflectance to the laser light exists. In this case, the correction amount $\Delta\alpha$ becomes too large and the reception time tp cannot be calculated accurately. Therefore, an accuracy of detection of the object is lowered.

SUMMARY OF THE INVENTION

In view of the foregoing problems, it is an object of the present invention to provide a radar apparatus which can enhance an accuracy of detection of an object.

In order to achieve the above object, a radar apparatus according to the present invention includes a laser light generating means, an optical means, a reflected light detecting means, an object detecting means and an intensity changing means.

The laser light generating means generates a laser light. The optical means reflects the laser light generated by the laser light generating means to output it in a predetermined direction. The optical means has at least two reflective surfaces with different reflectance to the laser light. The reflected light detecting means detects a reflected light when the laser light outputted from the optical means is reflected by an object. The object detecting means detects the object based on the reflected light detected by the reflected light detecting means. The intensity changing means changes an intensity of the laser light outputted from the optical means by switching the reflective surfaces.

Thus, the radar apparatus can change the intensity of the laser light outputted from the optical means according to a situation by using the intensity changing means. For example, the intensity changing means increases the intensity of the laser light when an object at a long distance or an object with low reflectance to the laser light is detected. To the contrary, the intensity changing means decreases the intensity of the laser light when an object at a short distance or an object with high reflectance to the laser light is detected. As a result, it can be prevented that a detection signal corresponding to an intensity of the reflected light becomes too large. Therefore, an accuracy of detection of the object can be improved.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS (First Embodiment)

A radar apparatus according to the first embodiment of the present invention is mounted in an inter-vehicle distance control system. The inter-vehicle distance control system controls a distance to a preceding vehicle at a desired distance and alarms when an obstacle exists in a predetermined area.

Figure 1:
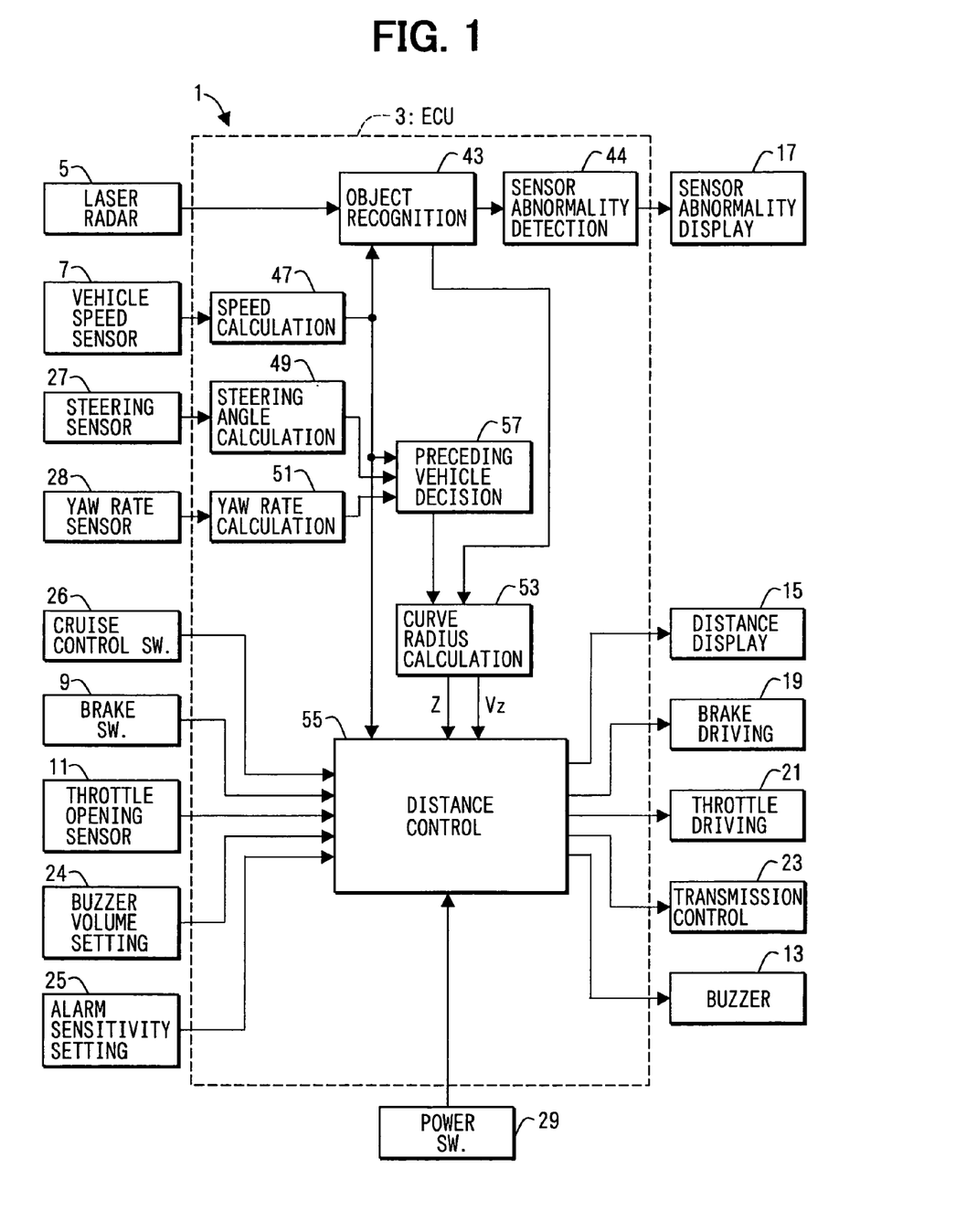
FIG. 1 is a block diagram of an inter-vehicle distance control system in which a radar apparatus according to a first embodiment of the present invention is mounted.

As shown in FIG. 1, an inter-vehicle distance control system 1 includes an electronic control unit (ECU) 3 as a main part. The ECU 3 includes a microcomputer, an input/output interface and the like.

The ECU 3 receives detection signals from a laser radar sensor 5, a vehicle speed sensor 7, a brake switch 9 and a throttle opening sensor 11. The ECU 3 outputs driving signals to an alarm buzzer 13, a distance display 15, a sensor abnormality display 17, a brake driving device 19, a throttle driving device 21 and an automatic transmission controller 23. The ECU 3 connects to a buzzer volume setting device 24 for setting volume of the alarm buzzer 13, an alarm sensitivity setting device 25 for setting sensitivity to decide necessity of the alarm, a cruise control switch 26, a steering sensor 27 for detecting an operation amount of a steering wheel and a yaw rate sensor 28 for detecting a yaw rate generated in a vehicle. The ECU 3 starts predetermined processing when a power switch 29 is turned on.

Figure 2:
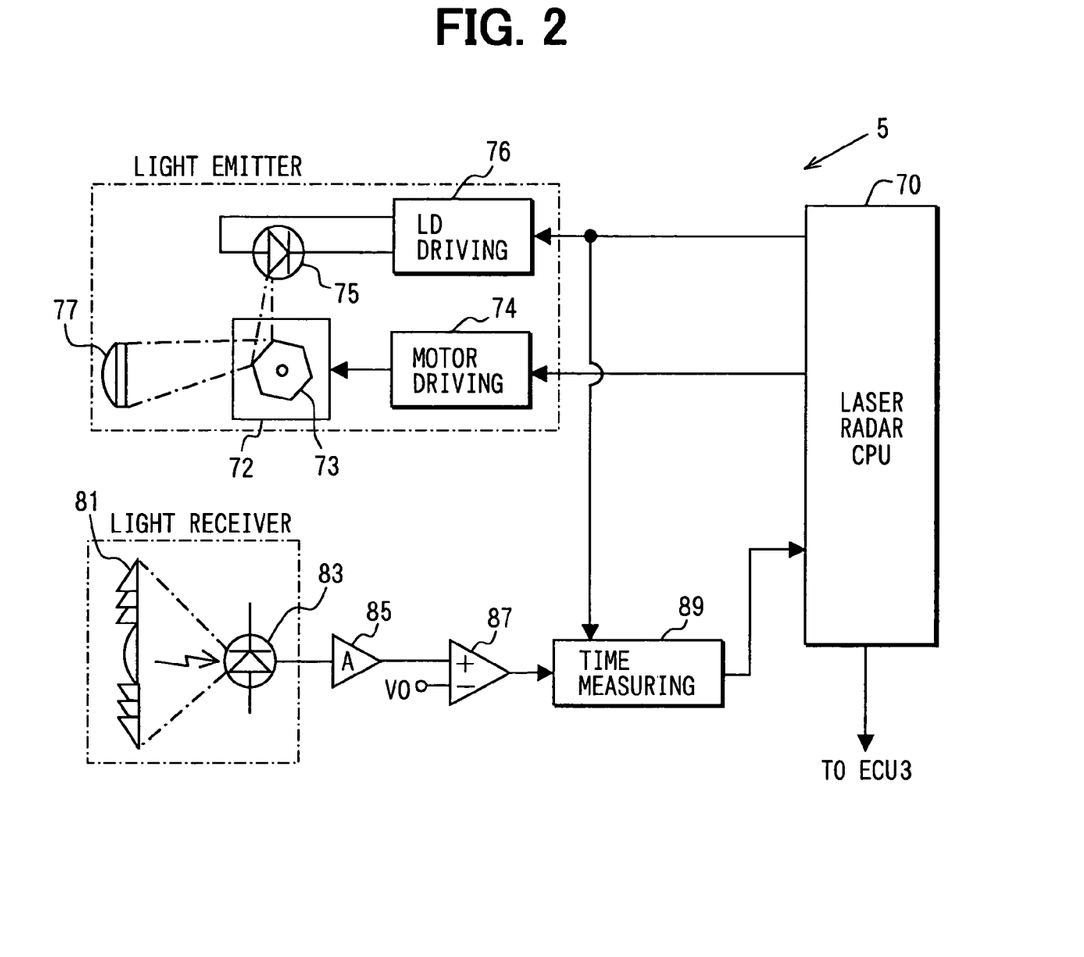
FIG. 2 is a block diagram of a laser radar sensor in the radar apparatus.

As shown in FIG. 2, the laser radar sensor 5 includes a light emitter, a light receiver, a laser radar central processing unit (CPU) 70 and the like. The light emitter includes a semiconductor laser diode (hereinafter, referred to as "laser diode") 75, which emits a pulsed laser light through a scanner 72 and a lens 77. The laser diode 75 is connected to the laser radar CPU 70 through a laser diode driving circuit 76 and emits the laser light by receiving a driving signal from the laser radar CPU 70. In the scanner 72, a polygon mirror 73 is disposed to rotate around a vertical axis. When the laser radar CPU 70 inputs a driving signal to a motor through a motor driving circuit 74, the motor drives the polygon mirror 73 to rotate. A rotation position of the motor is detected by a motor rotation position sensor and is outputted to the laser radar CPU 70.

Figure 3:
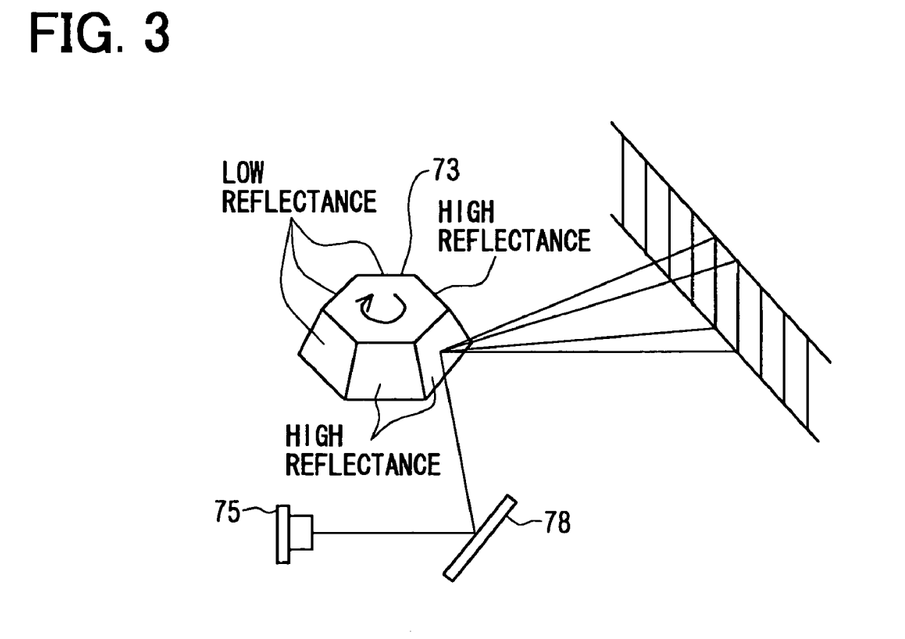
FIG. 3 is a schematic diagram of an optical system in the laser radar sensor.

As shown in FIG. 3, a laser light emitted from the laser diode 75 is reflected by a mirror 78 and runs toward a reflective surface which is formed on a side wall of the polygon mirror 73. In FIG. 2, the mirror 78 is omitted for simplification.

In the first embodiment, the polygon mirror 73 has six reflective surfaces on its side walls around the rotation axis. The reflective surfaces are divided into two sets of three adjacent reflective surfaces. In each set, three reflective surfaces are processed to have the same reflectance to the laser light. Each set has the reflectance which is different from that of the other set. For example, in order to form the reflective surface with high reflectance, a mirror material is attached by deposition or the like and the surface is smoothed by mirror finish. In contrast, in order to form the reflective surface with low reflectance, a low-reflectance material, whose reflectance to the laser light is lower than the mirror material, is attached by deposition or the like and the surface is processed not to be smoother than the reflective surface with high reflectance. Thus, two sets of the reflective surfaces are formed on the side walls of the polygon mirror 73. However, the method to form the reflective surfaces is not limited to the above method. For example, it is also possible that the reflective surfaces are colored in black in order to form the reflective surfaces with low reflectance. Otherwise, it is also possible that different materials are attached to two sets and they are finished by the same processing.

As described above, the polygon mirror 73 has two sets of the reflective surfaces with different reflectance to the laser light. Therefore, the light emitter can emit a laser light with suitable intensity according to various conditions by switching the reflective surfaces.

As described above, the polygon mirror 73 can be rotated by the motor. In addition, three reflective surfaces in each set have different tilt angles. Thus, the laser light can be emitted in a predetermined range of angle in a vehicle width direction and in a vehicle height direction. That is, multiple laser lights are emitted to the reflective surface while an angle of the reflective surface is changed by rotating the polygon mirror 73, so that the predetermined range of angle in the vehicle width direction can be scanned by the laser lights. Furthermore, the reflective surface is switched to another reflective surface with different tilt angle and the above scanning is performed, so that the predetermined range of angle in the vehicle width direction can be scanned for different height. Thus, the laser light can be emitted to a two-dimensional area in the vehicle width direction and in the vehicle height direction.

Figure 4:
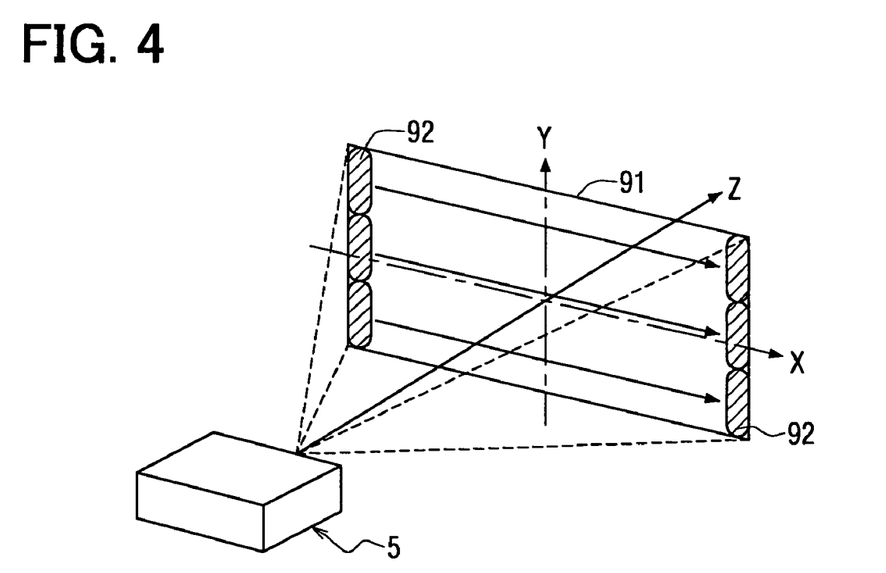
FIG. 4 is a perspective view of a measurement area of the laser radar sensor.

As shown in FIG. 4, the laser lights sequentially scan a measurement area 91, that is, a predetermined area on the X-Y plane. In FIG. 4, a pattern 92 of the laser lights is omitted partially. In this case, the X axis is a scanning direction and corresponds to the vehicle width direction. The Y axis is a reference direction and corresponds to the vehicle height direction. The Z axis corresponds to a direction to the center of the measurement area 91. An angle range in the X axis direction in the measurement area 91 is about 16 degrees (=0.08 degrees×201 points) and an angle range in the Y axis direction in the measurement area 91 is about 4 degrees (=1.4 degrees×3 scanning lines). The scanning is performed from the left to the right in the X axis direction and from the top to the bottom in the Y axis direction. Specifically, 201 laser lights are firstly emitted every 0.08 degrees in the X axis direction for the first scanning line at the top in the Y axis direction. Next, the same scanning is repeated for the second and third scanning lines in the Y axis direction. That is, the laser lights are emitted from the upper left to the lower right and 603 points (=201 points×3 scanning lines) of data can be obtained.

By the above two-dimensional scanning, scanning angles $\theta x$ and $\theta y$, which represent the scanning direction, and a time difference between an emission time when the laser light is emitted and a reception time when a reflected light from a reflecting object is received are obtained. The time difference represents a distance to the reflecting object. The scanning angle $\theta x$ is defined as an angle between the Z axis and a line that an emitted laser light is projected on the X-Z plane. The scanning angle $\theta y$ is defined as an angle between the Z axis and a line that an emitted laser light is projected on the Y-Z plane. The scanning angles $\theta x$ and $\theta y$ are calculated based on the rotation position of the motor.

In FIG. 2, the light receiver of the laser radar sensor 5 includes a light receiving lens 81 and a light receiving element 83. The light receiving lens 81 receives a laser light reflected by an object. The light receiving element 83 outputs a voltage corresponding to an intensity of the received laser light. A glass plate or a resin plate is attached to a surface of the laser radar sensor 5, for example, in order to protect a light emitting/receiving surface from the external environment.

An amplifier 85 amplifies the output voltage from the light receiving element 83. The amplified signal is inputted to a comparator 87 as a received signal. The comparator 87 compares the received signal with a reference voltage V0. When the received signal is larger than the reference voltage V0, the comparator 87 passes the received signal to a time measuring circuit 89. The reference voltage V0 is for avoiding an influence of noise.

The time measuring circuit 89 measures a start time and an end time of a time period when the received signal is larger than the reference voltage V0. The driving signal, which is outputted from the laser radar CPU 70 to the laser diode driving circuit 76, is inputted to the time measuring circuit 89. An input time ts of the driving signal, the start time and the end time of the above time period are converted to digital signals. The converted digital signals are outputted to the laser radar CPU 70. Hereinafter, the encoded digital signal is referred to as "time point data".

The laser radar CPU 70 calculates a distance data corresponding to a distance to the reflecting object based on the time point data, that is, the input time ts, the start time and the end time of the time period. The laser radar CPU 70 outputs a scanning data including the distance data, the scanning angles θx, θy and a reflected light intensity data Δt (described later) to the ECU 3.

Here, the reflected light intensity data Δt will be explained with reference to FIG. 5. Variables shown in FIG. 5 are defined as follows.

L1: received signal corresponding to reflected light with low intensity
L2: received signal corresponding to reflected light with high intensity
L3: received signal corresponding to reflected light with excessive intensity
V0: predetermined reference voltage for avoiding influence of noise
t11: time when rising of L1 crosses V0
t12: time when falling of L1 crosses V0
Δt1: reflected light intensity data (=time difference between t11 and t12)
t21: time when rising of L2 crosses V0
t22: time when falling of L2 crosses V0
Δt2: reflected light intensity data (=time difference between t21 and t22)
t31: time when rising of L3 crosses V0
t32: time when falling of L3 crosses V0
Δt3: reflected light intensity data (=time difference between t31 and t32)
tc1: mean time between t11 and t12
tc2: mean time between t21 and t22
tc3: mean time between t31 and t32
tp: reception time (=time when L1, L2 and L3 substantially reach peak voltage)
Δα1: correction amount for obtaining tp from tc1
Δα2: correction amount for obtaining tp from tc2
Δα3: correction amount for obtaining tp from tc3

Figure 5:
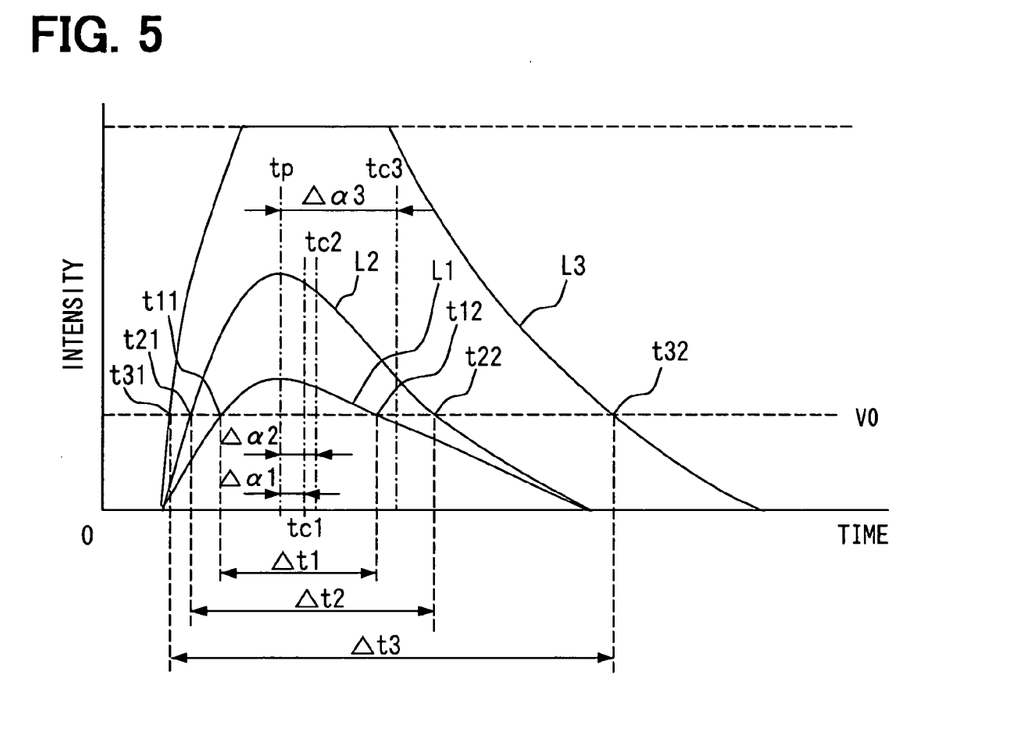
FIG. 5 is a waveform chart of received signals for explaining a correction of time point data.

As is clear in FIG. 5, the time differences Δt1, Δt2 and Δt3 have the relationship of Δt1<Δt2<Δt3. That is, the time difference increases as the intensity of the reflected light increases. Accordingly, the time differences Δt1, Δt2 and Δt3 are indicators to characterize the intensity of the reflected light. Therefore, the time differences Δt1, Δt2 and Δt3 are referred to as "reflected light intensity data".

Figure 6:
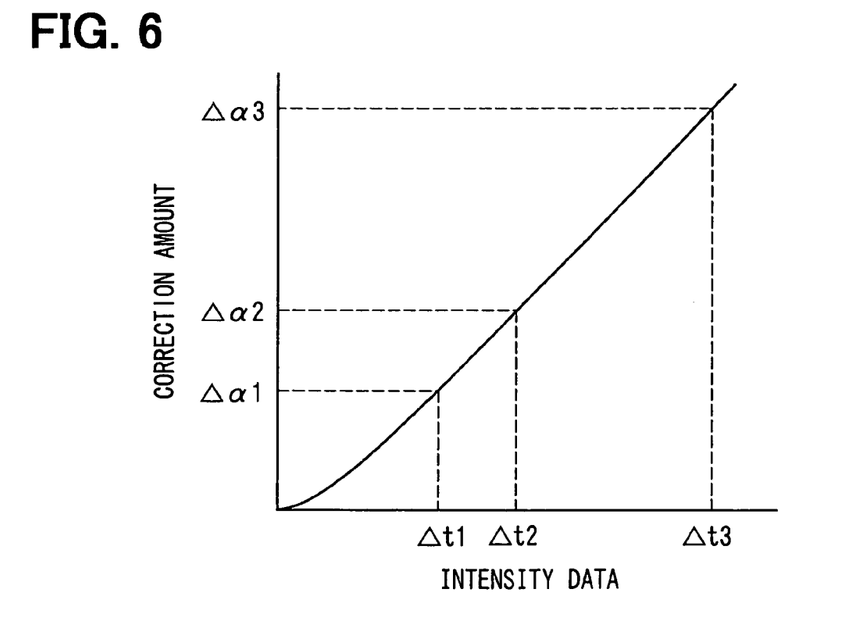
FIG. 6 is a characteristic graph of a relationship between a reflected light intensity data and a correction amount.

The correction amounts Δα1, Δα2 and Δα3 for correcting tc1, tc2 and tc3 to obtain the reception time tp correlate with the reflected light intensity data Δt1, Δt2 and Δt3 respectively. Specifically, as shown in FIG. 6, the correction amount tends to increase proportionally as the reflected light intensity data increases. In the first embodiment, the relationship between the reflected light intensity data and the correction amount is determined based on an experimental result or the like in advance and is stored in a read only memory (ROM) or the like. According to this relationship, the correction amount can be obtained based on the reflected light intensity data. By subtracting the correction amounts Δα1, Δα2 and Δα3 from the mean times tc1, tc2 and tc3 respectively, the reception time tp can be obtained. The distance to the reflecting object can be calculated based on a time difference between the input time ts of the driving signal of the laser diode 75 and the reception time tp.

Instead of the above correction, for example, it is possible that t11, t21 and t31 are regarded as the reception time of the received signals L1, L2 and L3 respectively. However, the slope of the rising and falling of the received signal depends on the intensity of the reflected light, which changes depending on an intensity of the emitted laser light, a reflectance of the object and the like. Accordingly, in this case, the reception time changes according to the intensity of the reflected light even when the distance to the reflecting object is the same. To the contrary, in this embodiment, the above correction can calculate the reception time tp which is substantially constant independent of the intensity of the reflected light. Therefore, a measurement error caused by a difference of the intensity of the reflected light can be corrected.

However, the above correction has the following disadvantage. When the intensity of the reflected light is too large and the received signal is saturated as shown by L3 in FIG. 5, the correction amount Δα3 becomes too large. Therefore, it is difficult to calculate the reception time tp accurately. Actually, a difference between the reception time tp obtained by the above correction and a time when the received signal actually reaches its peak tends to increase as the correction amount increases. Accordingly, the accuracy of measurement of the distance to the reflecting object is lowered when the reflected light with excessive intensity is received. Therefore, in the first embodiment, the intensity of the emitted laser lights is controlled according to a speed of the vehicle so that the intensity of the reflected light does not become too large. This control will be described later.

The ECU 3 recognizes an object based on the scanning data from the laser radar CPU 70 of the laser radar sensor 5 and obtains a condition data of a preceding vehicle. According to the condition data of the preceding vehicle, the ECU 3 performs the inter-vehicle distance control. Specifically, the ECU 3 outputs driving signals to the brake driving device 19, the throttle driving device 21 and the automatic transmission controller 23 to control the speed of the vehicle. In addition, alarm decision processing is performed to alarm, for example, when a recognized object exists in a predetermined area for a predetermined time interval. In this case, the object is a preceding vehicle, a stopped vehicle, a guardrail, a pole or the like.

In the ECU 3, as shown in FIG. 1, the scanning data outputted from the laser radar sensor 5 is inputted to an object recognition block 43. The object recognition block 43 converts the distance data and the scanning angles θx, θy of the scanning data to a three-dimensional position data, that is, a point in a X-Y-Z orthogonal coordinate system. In the X-Y-Z orthogonal coordinate system, the origin (0, 0, 0) is the center of the laser radar sensor 5. The X, Y and Z axes are the vehicle width direction, the vehicle height direction and the vehicle traveling direction respectively. In this case, data of the reflected light whose intensity is lower than a predetermined value is not converted. The three-dimensional position data is processed in object modeling processing as described below in order to recognize an object.

In the object modeling processing, firstly, the three-dimensional position data which satisfy a predetermined condition are integrated into a segment data. Specifically, for example, two points of the three-dimensional position data are integrated into the same segment data when a distance $\Delta x$ between two points in the X axis direction is smaller than 0.2 m and a distance $\Delta Z$ between two points in the Z axis direction is smaller than 2 m. In the first embodiment, the segment data is generated every scanning line because three scanning lines are provided in the Y axis direction.

Next, the segment data, which are close to each other in the three-dimensional space, are integrated and approximated to a rectangular solid. Three sides of the rectangular solid are parallel to the X, Y and Z axes respectively. A data content of the rectangular solid is coordinates (X, Y, Z) of its center and side lengths (W, H, D) representing its size.

Next, a relative speed (Vx, Vy, Vz) of the rectangular solid with reference to a position of the vehicle is calculated based on a change of the coordinates (X, Y, Z). Then, it is decided whether the object is at rest or in motion based on the relative speed (Vx, Vy, Vz) and the speed of the vehicle. The speed of the vehicle is calculated by a vehicle speed calculation block 47 based on a value detected by the vehicle speed sensor 7.

The object recognition block 43 inputs the data obtained in the object modeling processing, that is, the coordinates (X, Y, Z), the side lengths (W, H, D), the relative speed (Vx, Vy, Vz) and the decision whether the object stops or moves to a sensor abnormality detection block 44 and a preceding vehicle decision block 53.

The sensor abnormality detection block 44 detects whether the data from the object recognition block 43 is in a range of abnormal value or not. When the data is in the range of abnormal value, the sensor abnormality display 17 shows this.

A steering angle calculation block 49 calculates a steering angle based on a signal from the steering sensor 27. A yaw rate calculation block 51 calculates a yaw rate based on a signal from the yaw rate sensor 28. A curve radius calculation block 57 calculates a curve radius R based on the speed of the vehicle from the vehicle speed calculation block 47, the steering angle from the steering angle calculation block 49 and the yaw rate from the yaw rate calculation block 51.

The preceding vehicle decision block 53 decides the nearest preceding vehicle based on the curve radius R, the coordinates (X, Y, Z), the side lengths (W, H, D) and the relative speed (Vx, Vy, Vz) of the object in the data from the object recognition block 43. The preceding vehicle decision block 53 inputs a distance Z to the nearest preceding vehicle and a relative speed Vz of the nearest preceding vehicle to an inter-vehicle distance control block 55.

The inter-vehicle distance control block 55 decides whether alarming is required or not and a content of speed control of the vehicle, based on the distance Z to the nearest preceding vehicle, the relative speed Vz of the nearest preceding vehicle, a setting of the cruise control switch 26, a pedaling condition of the brake switch 9, an opening degree from the throttle opening sensor 11 and a sensitivity setting of the alarm sensitivity setting device 25. When the alarming is required, an alarming signal is outputted to the alarm buzzer 13. Control signals are outputted to the brake driving device 19, the throttle driving device 21 and the automatic transmission controller 23 to perform the content of speed control of the vehicle. When this speed control is performed, the distance display 15 shows the present condition to a driver.

Figure 7:
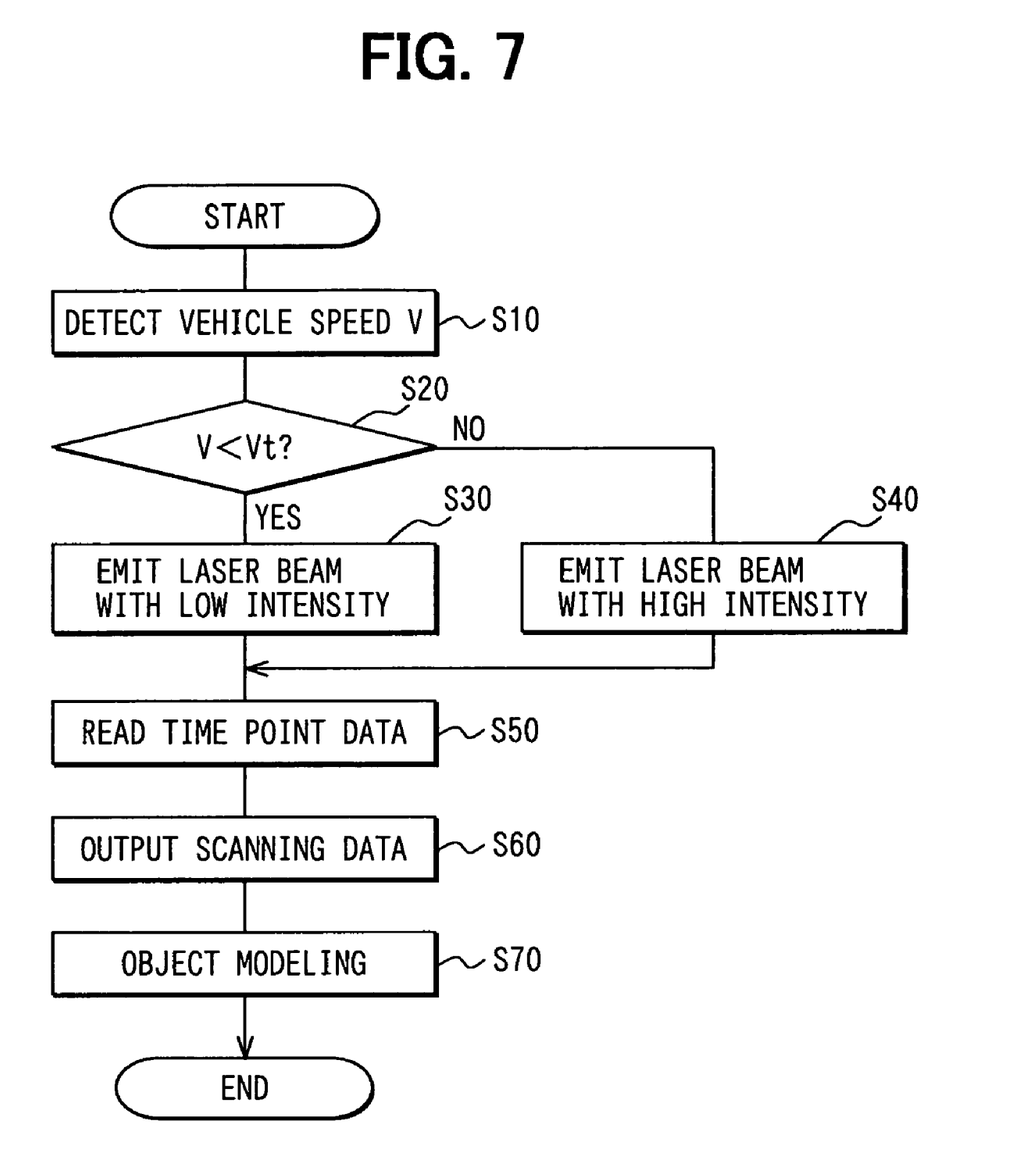
FIG. 7 is a flow diagram of processing to recognize an object according to the first embodiment.

In the first embodiment, the processing to recognize the object is attained as shown in FIG. 7. The laser radar CPU 70 detects the speed V of the vehicle by using the vehicle speed calculation block 47 at step S10. At step S20, it is decided whether the speed V detected at step S10 is smaller than a predetermined value Vt (e.g., 5 km/h) or not. When the decision at step S20 is "YES", the processing proceeds to step S30. When the decision at step S20 is "NO", the processing proceeds to step S40.

At step S30, the laser lights with low intensity are emitted from the light emitter toward the measurement area 91 by the reflective surfaces with low reflectance in the polygon mirror 73. At step S40, the laser lights with high intensity are emitted by the reflective surfaces with high reflectance in the polygon mirror 73.

When the reflected light is received, the laser radar CPU 70 of the laser radar sensor 5 reads the time point data every scanning line at step S50. The whole measurement period of three scanning lines in the laser radar sensor 5 is 100 msec. At step S60, the distance data and the reflected light intensity data $\Delta t$ are calculated from the read time point data. These calculated data and the scanning angles $\theta x$ and $\theta y$, that is, the scanning data is outputted to the object recognition block 43.

At step S70, the object recognition block 43 performs the above object modeling processing. Specifically, the object recognition block 43 inputs the data obtained in the object modeling processing to the sensor abnormality detection block 44 and the preceding vehicle decision block 53. These blocks 44 and 53 perform the above processing. Steps S10–S70 are repeated every control time step.

In the above processing to recognize the object, at steps S30 and S40, the intensity of the laser lights is switched according to the speed of the vehicle. Generally, the speed of the vehicle correlates with a distance to an object in front of the vehicle, for example, a distance between the vehicle and a preceding vehicle. Specifically, the distance to the object in front of the vehicle tends to become larger as the speed of the vehicle becomes higher and the distance to the object in front of the vehicle tends to become smaller as the speed of the vehicle becomes lower. That is, the distance to the object in front of the vehicle can be assumed from the speed of the vehicle. Therefore, the intensity of the laser lights is increased when the speed of the vehicle is high and the intensity of the laser lights is decreased when the speed of the vehicle is low. Thus, the laser lights with low intensity are emitted when a possibility of existence of an object at a short distance is high and the laser lights with high intensity are emitted when a possibility of existence of an object at a long distance is high. That is, the laser lights whose intensity is suitable for the distance to the object are emitted. Accordingly, it can be prevented that the intensity of the reflected light from the object becomes too large. Therefore, an accuracy of detection of the object can be increased independent of the distance to the object.

Furthermore, a possibility of existence of a pedestrian around the vehicle is high when the speed of the vehicle is low. In this case, according to the above processing to recognize the object, the intensity of the laser lights is decreased. Therefore, a continuous emission of the laser lights to the pedestrian can be prevented.

(Second Embodiment)

In the first embodiment, the intensity of the laser lights is switched according to the speed of the vehicle. To the contrary, in the second embodiment, the intensity of the laser lights is switched according to a distance to a reflecting object.

Figure 8:
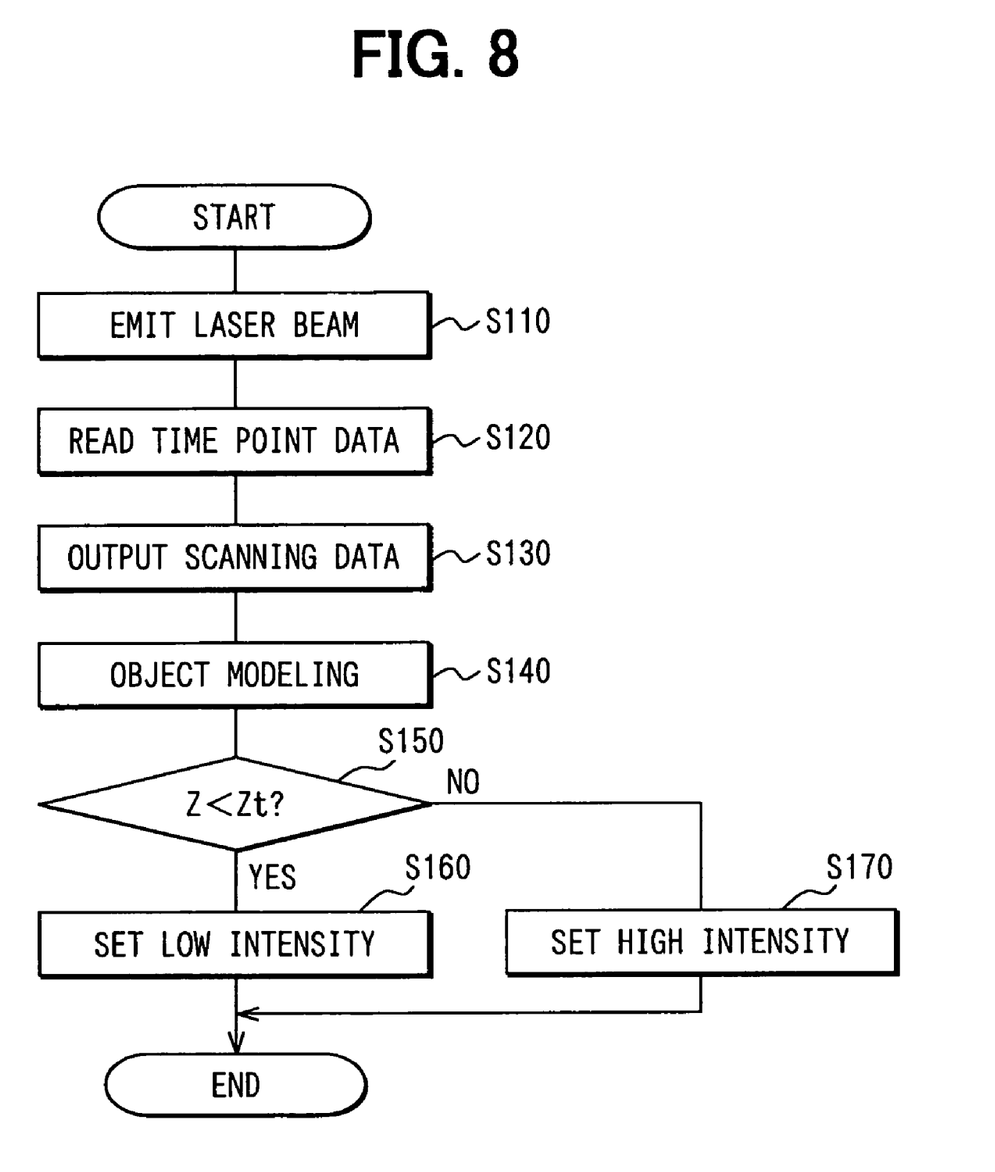
FIG. 8 is a flow diagram of processing to recognize an object according to a second embodiment.

In the second embodiment, the processing to recognize the object is attained as shown in FIG. 8. The laser lights are emitted at step S110. When step S110 is performed in the first repetition of the processing, the intensity of the laser lights is set to a default value. For example, the default value is set to be high to detect all of the reflecting objects in the measurement area 91. When step S110 is performed in the second repetition of the processing or later, the intensity of the laser lights is set to the intensity set at step S160 or S170 in the previous repetition.

When the reflected light is received, the laser radar CPU 70 of the laser radar sensor 5 reads the time point data every scanning line at step S120. At step S130, the distance data and the reflected light intensity data Δt are calculated from the read time point data. These calculated data and the scanning angles θx and θy, that is, the scanning data is outputted to the object recognition block 43. Similarly to the first embodiment, the object recognition block 43 performs the object modeling processing at step S140.

At step S150, it is decided whether a distance to the reflecting object is smaller than a predetermined distance Zt or not based on the distance Z in the coordinates (X, Y, Z) of the reflecting object, which is obtained in the object modeling processing. When the decision at step S150 is "YES", the processing proceeds to step S160. When the decision at step S150 is "NO", the processing proceeds to step S170.

At step S160, the intensity of the laser lights emitted in the next scanning is set to be low. At step S170, the intensity of the laser lights emitted in the next scanning is set to be high. Steps S110–S170 are repeated every control time step.

In the above processing to recognize the object, at steps S160 and S170, the intensity of the laser lights is switched according to the distance to the reflecting object. Thus, the laser lights whose intensity is suitable for the distance to the reflecting object are emitted at step S110 in the next scanning. Accordingly, it can be prevented that the intensity of the reflected light from the reflecting object becomes too large. Therefore, the reflecting object can be detected accurately independent of the distance to the reflecting object.

In the second embodiment, the distance Z obtained in the object modeling processing in the recognition block 43 is used to decide the distance to the reflecting object. However, it is also possible that the distance data of the scanning data from the laser radar CPU 70 is used.

(Third Embodiment)

In the third embodiment, the intensity of the laser lights is switched according to the reflected light intensity data Δt of the scanning data.

Figure 9:
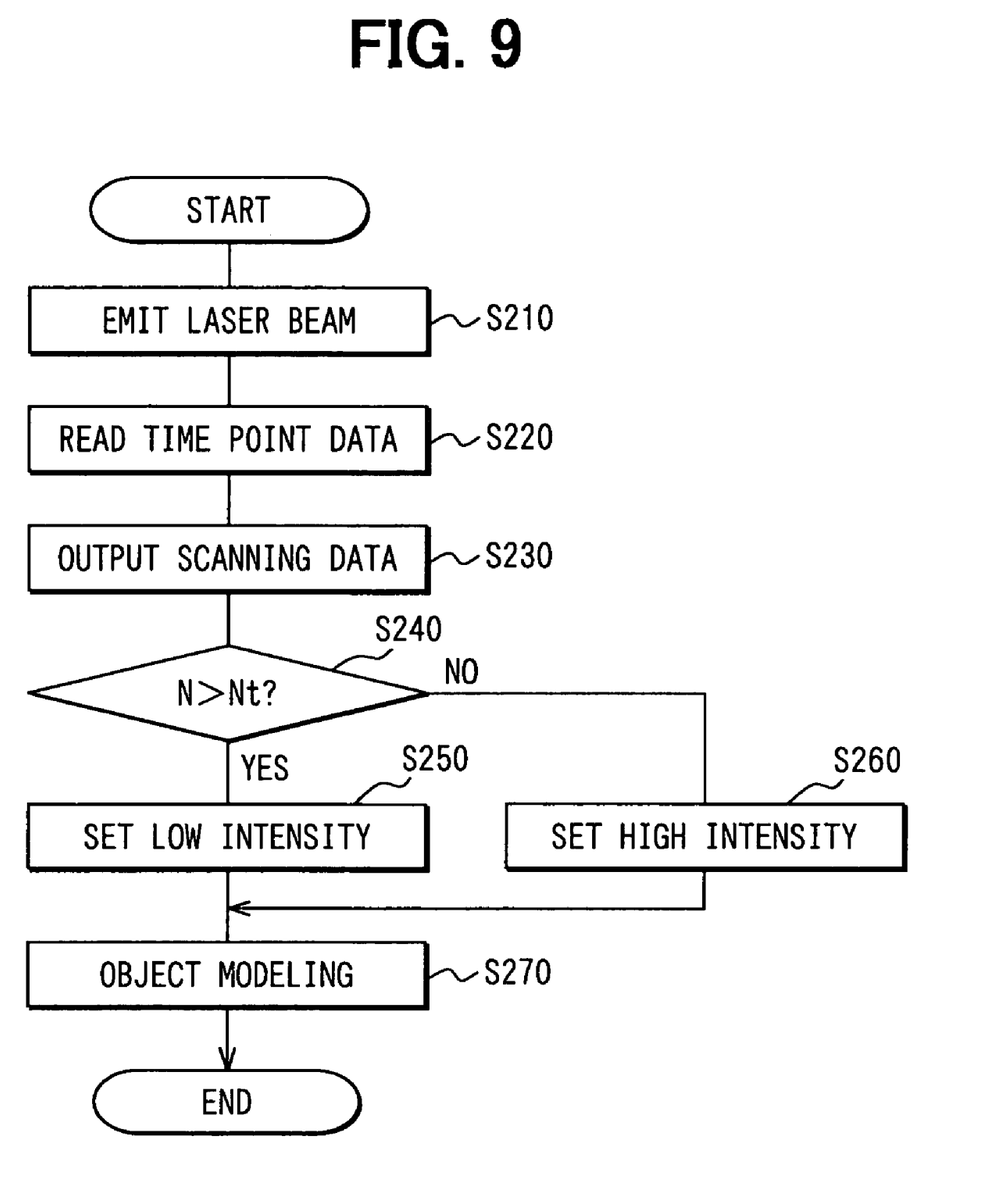
FIG. 9 is a flow diagram of processing to recognize an object according to a third embodiment.

In the third embodiment, the processing to recognize the object is attained as shown in FIG. 9. The laser lights are emitted at step S210. When step S210 is performed in the first repetition of the processing, the intensity of the laser lights is set to the default value. For example, the default value is set to be high similarly to the second embodiment. When step S210 is performed in the second repetition of the processing or later, the intensity of the laser lights is set to the intensity set at step S250 or S260 in the previous repetition.

When the reflected light is received, the laser radar CPU 70 of the laser radar sensor 5 reads the time point data every scanning line at step S220. At step S230, the distance data and the reflected light intensity data Δt are calculated from the read time point data. These calculated data and the scanning angles θx and θy, that is, the scanning data is outputted to the object recognition block 43.

At step S240, it is decided whether the reflected light intensity data Δt calculated at step S230 is larger than a predetermined intensity. This decision is performed for the reflected light intensity data Δt of the scanning data in three scanning lines. When the number N of the reflected light intensity data Δt which is larger than the predetermined intensity is larger than a predetermined value Nt for avoiding an influence of noise, the decision at step S240 is "YES" and the processing proceeds to step S250. Otherwise, the decision at step S240 is "NO" and the processing proceeds to step S260.

At step S250, the intensity of the laser lights emitted in the next scanning is set to be low. At step S260, the intensity of the laser lights emitted in the next scanning is set to be high. Similarly to the first and second embodiments, the object recognition block 43 performs the object modeling processing at step S270. Steps S210–S270 are repeated every control time step.

In the above processing to recognize the object, at steps S250 and S260, the intensity of the laser lights is switched according to the reflected light intensity data Δt of the scanning data. Thus, the laser lights whose intensity is corrected to be suitable for the detection of the reflecting object are emitted at step S210 in the next scanning. Therefore, the reflecting object can be detected accurately.

(Modifications)

In the above embodiments, the intensity of the emitted laser lights is switched by using the reflective surfaces with different reflectance in the polygon mirror 73. However, it is possible that a voltage applied to the laser diode 75 is changed. In this case, the laser radar CPU 70 outputs the driving signal including a direction signal to direct the intensity of the laser lights to the laser diode driving circuit 76. The laser diode driving circuit 76 applies the voltage corresponding to the directed intensity of the laser lights. Furthermore, in order to change the intensity of the emitted laser lights, it is also possible that multiple reflective surfaces with different reflectance are formed on the mirror 78. In this case, these reflective surfaces are switched by rotation, sliding or the like.

In the above embodiments, the polygon mirror 73 has two sets of reflective surfaces and the sets have different reflectance to the laser light. Accordingly, the intensity of the laser lights is changed at two stages. However, it is possible that the intensity of the laser lights is changed at three stages or larger.

In the above embodiments, six reflective surfaces in the polygon mirror 73 are divided into three reflective surfaces with high reflectance and three reflective surfaces with low reflectance. However, it is possible that the number of the reflective surfaces with high reflectance and the number of the reflective surfaces with low reflectance are different. Furthermore, it is possible that the reflectance to the laser lights in each reflective surface is set freely.

In the above embodiments, the speed of the vehicle, the distance to the reflecting object and the reflected light intensity data Δt are used as a predetermined parameter which corresponds to an intensity of the reflected light. However, it is possible that other parameters are used.

What is claimed is:

1. A radar apparatus, comprising:
a laser light generating means for generating a laser light;
an optical means for reflecting the laser light generated by
the laser light generating means to output the laser light in a predetermined direction, the optical means having at least two reflective surfaces with different reflectance to the laser light;

a reflected light detecting means for detecting a reflected light when the laser light outputted from the optical means is reflected by an object;

an object detecting means for detecting the object based on the reflected light detected by the reflected light detecting means; and an intensity changing means for changing an intensity of the laser light outputted from the optical means by switching the reflective surfaces.

2. The radar apparatus according to claim 1, wherein:
the optical means includes a rotatable object which rotates around a rotation axis;
the reflective surfaces are formed on a side wall of the rotatable object; and
the rotatable object rotates so that the reflective surfaces reflect the laser light generated by the laser light generating means to output the laser light in a predetermined range of angle in a rotation direction of the rotatable object.

3. The radar apparatus according to claim 2, wherein:
the reflective surfaces have different tilt angles with reference to the rotation axis of the rotatable object to change a direction of the laser light.

4. The radar apparatus according to claim 1, wherein:
the laser light generating means, the optical means, the reflected light detecting means, the object detecting means and the intensity changing means are mounted in a vehicle; and
the intensity changing means changes the intensity of the laser light outputted from the optical means based on a speed of the vehicle.

5. The radar apparatus according to claim 4, wherein the intensity changing means increases the intensity of the laser light outputted from the optical means as the speed of the vehicle becomes higher.

6. The radar apparatus according to claim 1, wherein:
the object detecting means detects at least a distance to the object based on a time period between a time when the laser light is outputted from the optical means and a time when the reflected light is detected by the reflected light detecting means; and
the intensity changing means changes the intensity of the laser light outputted from the optical means based on the distance to the object.

7. The radar apparatus according to claim 6, wherein the intensity changing means increases the intensity of the laser light outputted from the optical means as the distance to the object becomes larger.

8. The radar apparatus according to claim 1, wherein:
the reflected light detecting means outputs a reception signal according to an intensity of the reflected light; and
the intensity changing means changes the intensity of the laser light outputted from the optical means based on a time period when the reception signal is larger than a predetermined value.

9. The radar apparatus according to claim 8, wherein the intensity changing means decreases the intensity of the laser light outputted from the optical means when the time period becomes longer than a predetermined time period.

* * * * *